F. L. O. WADSWORTH.
MINING MACHINE.
APPLICATION FILED FEB. 19, 1912. RENEWED OCT. 12, 1918.
1,304,829.
Patented May 27, 1919.
6 SHEETS—SHEET 1.
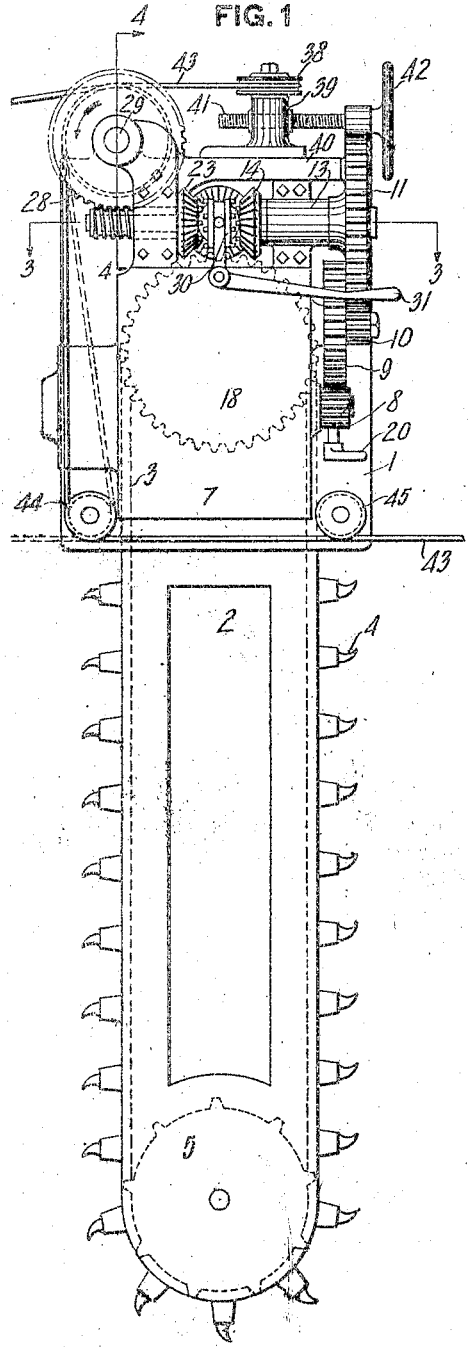
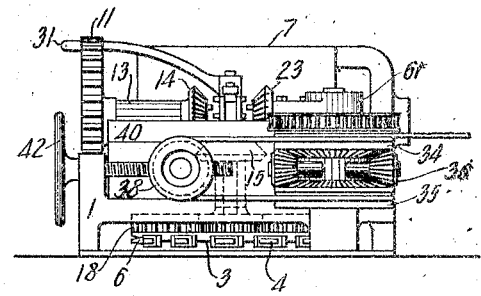
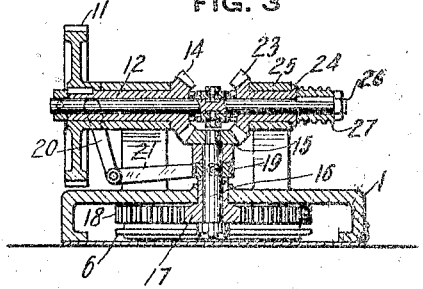
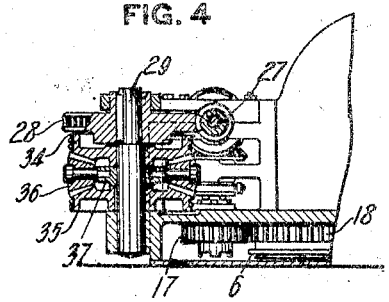
WITNESSES
INVENTOR F. L. O. WADSWORTH.
MINING MACHINE.
APPLICATION FILED FEB. 19, 1912. RENEWED OCT. 12, 1918.
1,304,829.
Patented May 27, 1919.
6 SHEETS—SHEET 2.
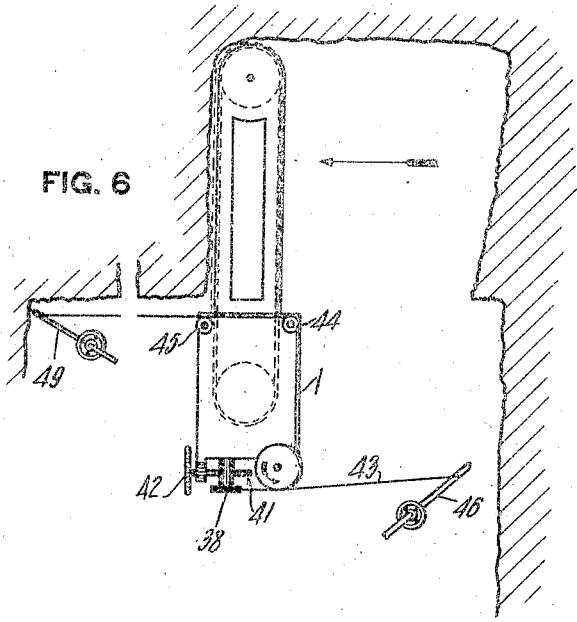
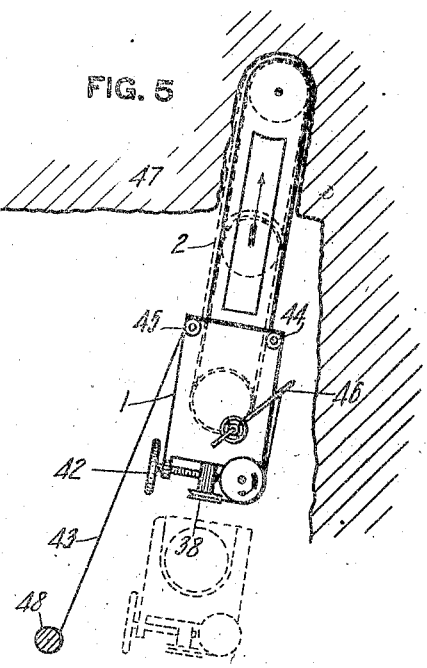
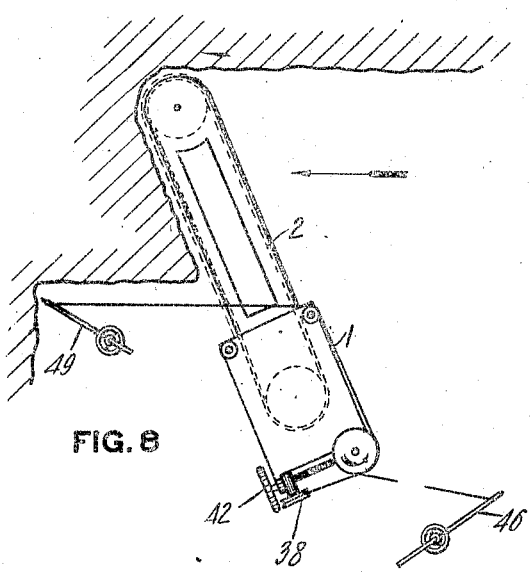
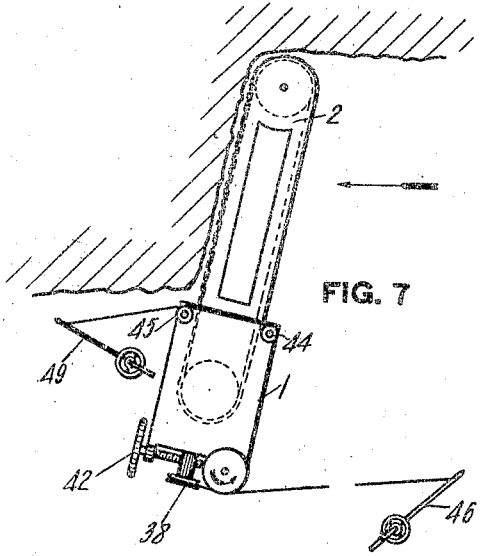

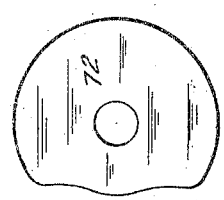
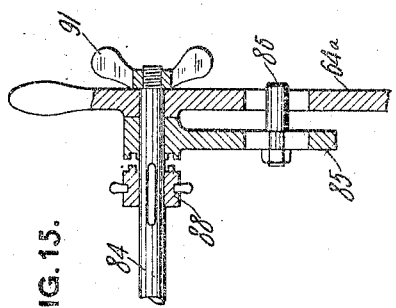
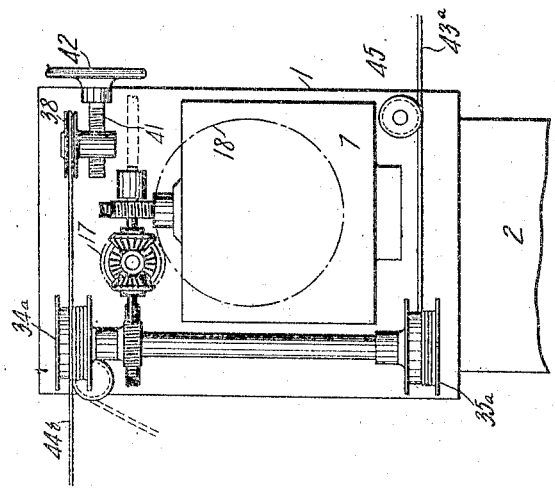
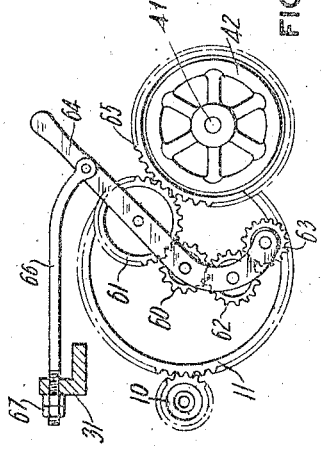
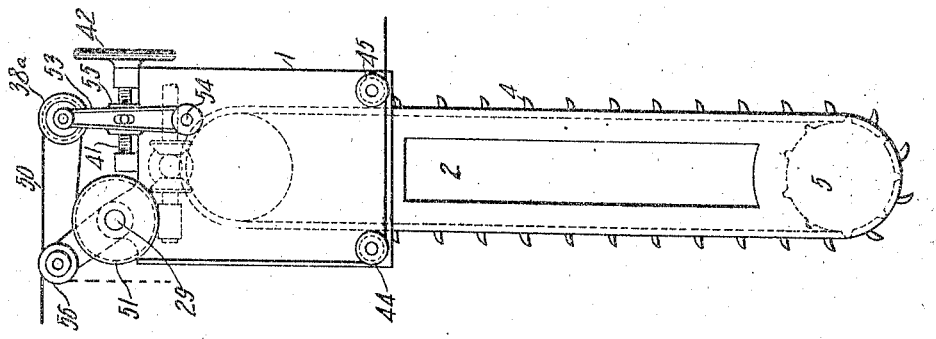

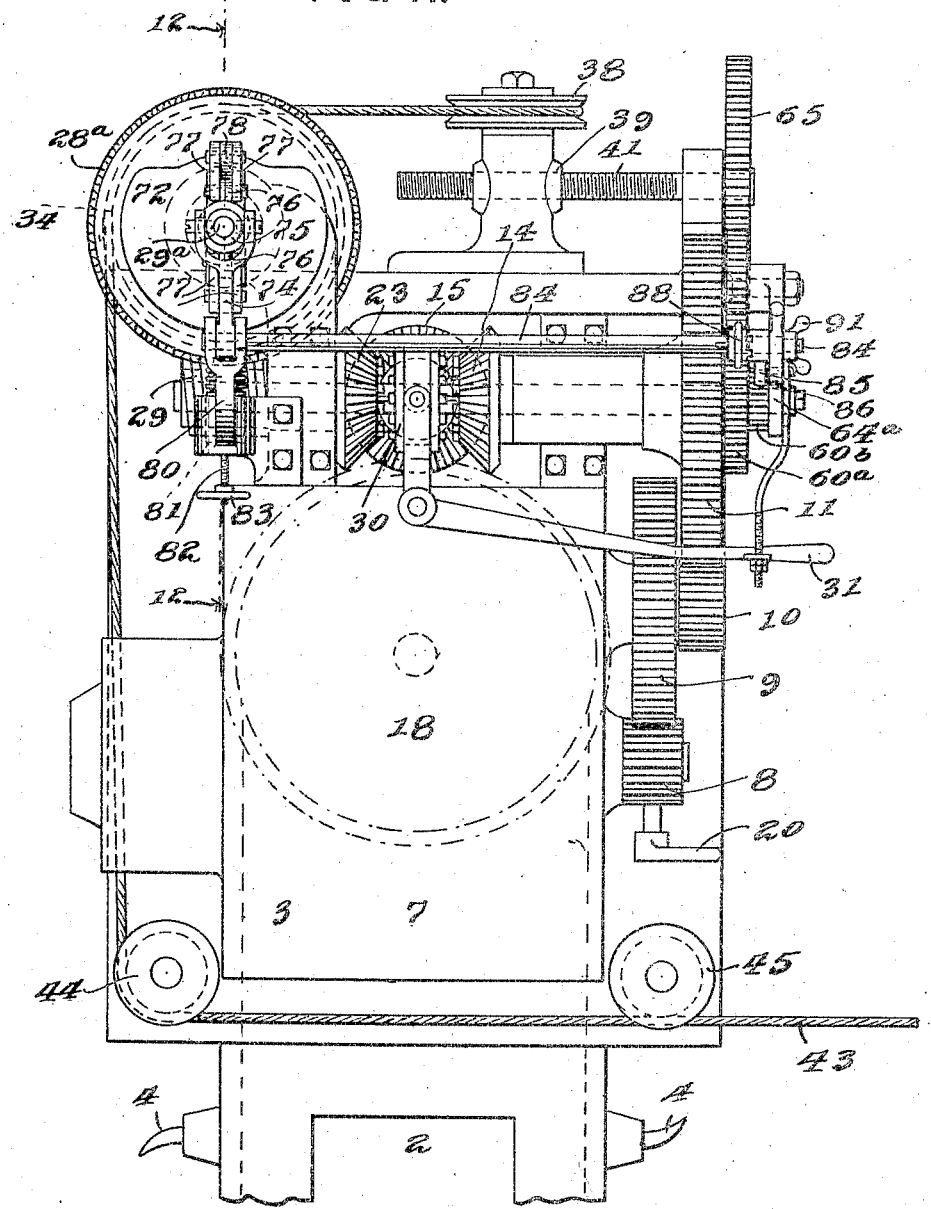

F. L. O. WADSWORTH.
MINING MACHINE.
APPLICATION FILED FEB. 19, 1912. RENEWED OCT. 12, 1918.
1,304,829.
Patented May 27, 1919.
6 SHEETS—SHEET 5
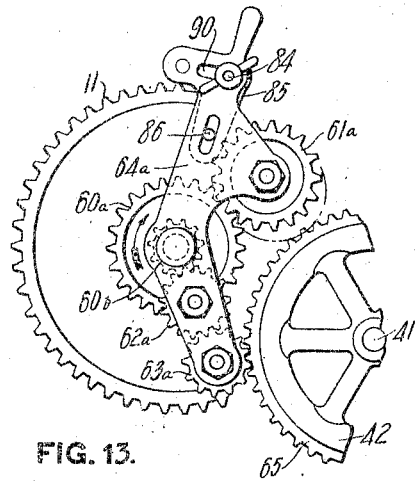
FIG. 13.
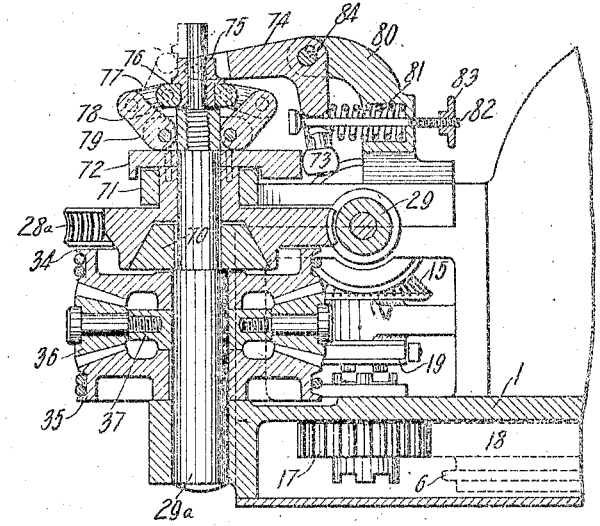
FIG. 12.
FIG. 18.
FIG. 17.
WITNESSES
INVENTOR F. L. O. WADSWORTH.
MINING MACHINE.
APPLICATION FILED FEB. 19, 1912. RENEWED OCT. 12, 1918.
1,304,829.
Patented May 27, 1919.
6 SHEETS—SHEET 6.
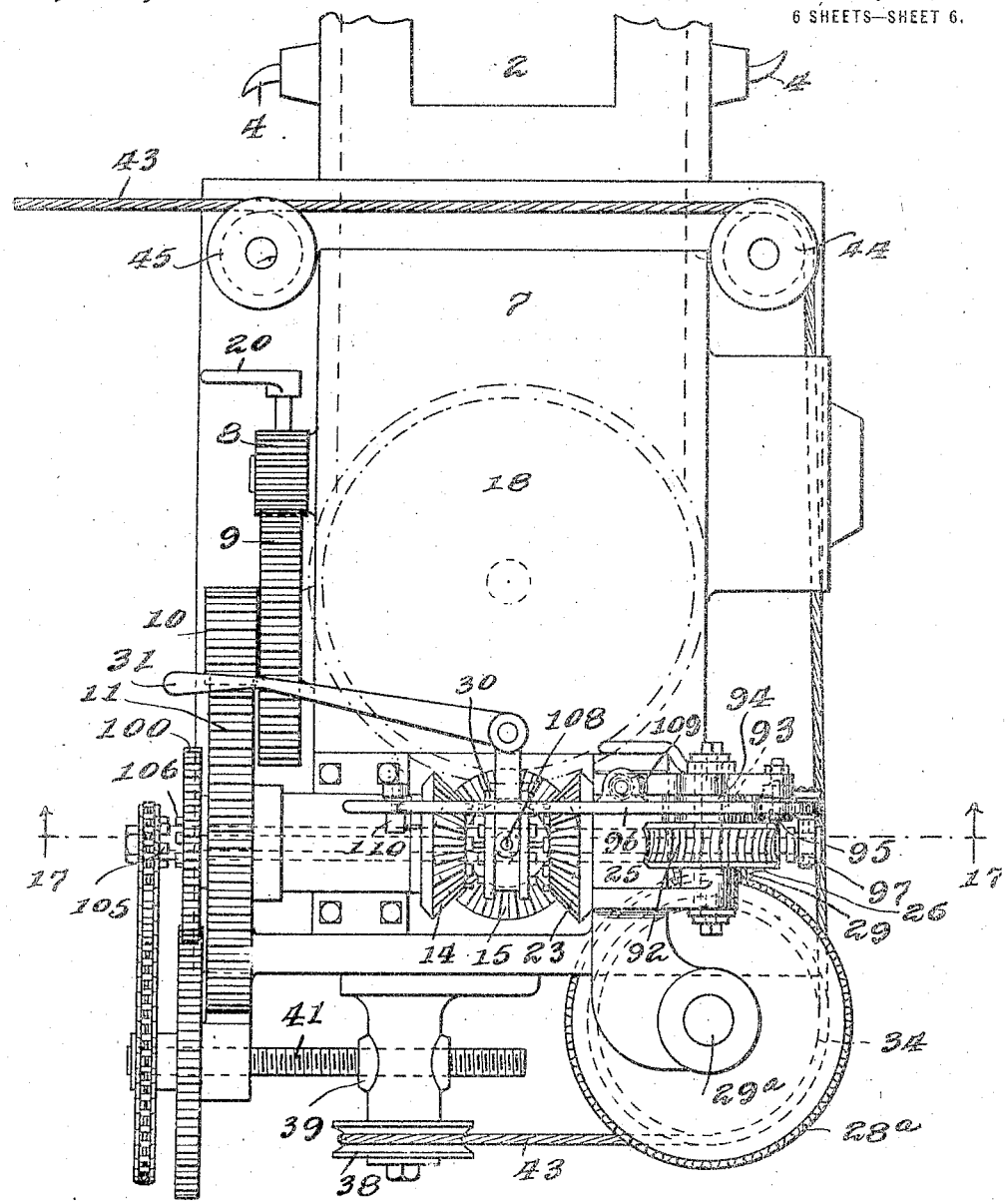
FIG.16.
FIG.19.
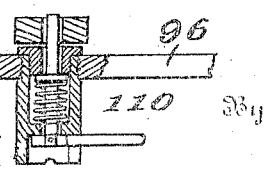
Witnesses
N. N. Lybrand
George E. Edelin
Inventor
F. L. O. Wadsworth
By H. H. Bliss
Attorney

UNITED STATES PATENT OFFICE.

FRANK L. O. WADSWORTH, OF SEWICKLEY, PENNSYLVANIA, ASSIGNOR TO THE JEFFREY MANUFACTURING COMPANY, OF COLUMBUS, OHIO, A CORPORATION OF OHIO.

MINING-MACHINE.

1,304,829.

Specification of Letters Patent.

Patented May 27, 1919.

Application filed February 19, 1912, Serial No. 678,567. Renewed October 12, 1918. Serial No. 257,862.

*To all whom it may concern:*

Be it known that I, FRANK L. O. WADSWORTH, a resident of Sewickley, in the county of Allegheny and State of Pennsylvania, have invented a new and useful Improvement in Mining-Machines, of which the following is a specification.

This invention relates to mining machines, and more particularly to that type known as "short wall" coal mining machines. The principal objects of the invention are to provide an arrangement of mechanism and means for more effectively guiding and feeding the machine to its cut without the use of a guide frame or "pan," which is more convenient to use in low seam mines than prior arrangements of mechanism for this purpose, which holds the machine and feeds the same in proper position to the face being cut, by means of which the position or angle of the machine can be readily and conveniently varied to suit various conditions of material being cut, and by means of which the cutting action is substantially equal at all times notwithstanding the change of angle or position of the machine.

Other objects and advantages will appear in connection with the description of the particular mechanism or specific embodiments which have been shown to illustrate the invention.

In the accompanying drawings Figure 1 is a general plan view of one form of mining machine embodying the invention; Fig. 2 is a rear end view of the same; Fig. 3 is a vertical transverse section on the line 3—3, Fig. 1; Fig. 4 is a vertical longitudinal section on the line 4—4, Fig. 1; Figs. 5, 6, 7 and 8 are diagrammatic plan views illustrating the feeding and guiding of the machine to its work; Fig. 9 is a plan view illustrating another embodiment of the invention; Fig. 10 is a detail showing means for automatically throwing out the shifting clutch; Fig. 11 is a fragmentary plan view of a modified form of machine; Fig. 12 is a vertical section taken on the line 12—12 of Fig. 11; Fig. 13 is a detail view of that portion of the machine last referred to showing power means for actuating the sheave block; Figs. 14 and 15 are detail views of parts of this same machine; Fig. 16 is a fragmentary plan view of still another modified form of machine; Fig. 17 is a vertical transverse view taken on the line 17—17 of Fig. 16; Fig. 18 is a detail view of that portion of the machine shown in Fig. 16 for driving the sheave block adjusting means; Fig. 19 is a detail view of parts shown in Figs. 16 and 17; and Fig. 20 is a detail view of a modified arrangement of feeding and guiding devices for the machine.

In the use of the machine known as "short wall" coal cutting machines considerable inconvenience is experienced in cutting thin veins where the thickness is frequently not more than two and one-half to three feet. In order to properly feed the machine to its cut, or "sump-in," as well as to cross cut along the face of the chamber, it is necessary to anchor the ends of the cables or chains at both ends. With machines as heretofore constructed it is necessary to place two jacks in proper position for anchoring the two ends of the cable or chain when "sumping in," and when this operation is finished one of those jacks must be removed from its anchorage and placed at the opposite end of the chamber, the cable or chain must be pulled back through the machine and an end carried over and secured to the newly placed jack. This is rather arduous work in low-ceiling chambers and consumes considerable time. Furthermore, in case it is desired to change the angle of the machine with reference to the face it is cutting, it is, with some types of machines, necessary to go to one of the jacks and loosen up the cable or chain therefrom to permit the machine to be shifted to the new angular position. This necessitates the machine runner leaving his position and going to one or the other end of the chamber.

Besides the foregoing there are other difficulties and inconveniences in the operation of undercutting machines as at present constructed and arranged.

The principal object of the present invention is to provide an arrangement of machine whereby these inconveniences are overcome, and whereby are secured the several improved functions and advantages hereinbefore enumerated, as well as enabling all these functions and advantages to be attained without requiring the machine runner to leave his position at the machine, without the necessity of transferring a jack from one position in the mine when sumping-in to another position in the mine when cross cutting, and without the necessity of pulling the feed cable or chain back through the machine for any purpose.

I will first describe a simple form of machine embodying the invention, then describe the operation or manipulation thereof, and follow this by description of forms of machines wherein the same purposes are effected but by more completely automatic means than in the simplest forms of machines.

In the simple form of machine shown in Figs. 1 to 8, the main frame 1 is provided with a suitable base for its support directly on the floor of the mine. The cutter bar 2 may be of any suitable construction and is provided with an endless cutter chain 3 carrying cutter bits 4. The cutter chain is carried by an idle sprocket 5 at the outer end of cutter bar 2 and a driving sprocket 6 in the bottom hollow portion of the machine frame 1. The frame 1 is open at its rear end, as shown in Fig. 2, to allow for the discharge of the dust and chips produced by the cutting. The chain may be driven from any suitable motor, the drawing showing diagrammatically an electric motor 7 mounted on top of the frame 1, although a compressed air or other prime mover may be used. This motor is arranged with its driving shaft transverse to the main frame and cutter bar extension. Said driving shaft at one end is provided with a pinion 8 meshing with a spur gear 9 which rotates on a suitable stud on the machine frame and has either secured thereto or formed integral therewith a pinion 10 which engages with the spur gear 11 secured to one end of a sleeve 12 rotatable in a bearing 13 on the machine frame. On the inner end of sleeve 12 is a miter gear 14 which meshes with a corresponding gear 15 on a vertical shaft 16 mounted in suitable bearings on the bed frame 1. The shaft 16 extends downwardly through the top plate of the bed frame 1 and at its lower end carries a spur pinion 17 which meshes with the master spur gear 18 on the shaft of the chain driving sprocket 6. A clutch 19 is splined to the vertical shaft 16 and is arranged to connect and disconnect the pinion 17 to shaft 16. This is the main clutch for stopping and starting the cutter chain when it is desired to operate other parts of the mechanism without moving the cutting mechanism. A suitable handle 20 actuates an arm 21 for shifting said clutch.

Also meshing with the miter gear 15 is a corresponding gear 23 secured to the inner end of a sleeve 24 rotatably mounted in bearing 25 in the machine frame. Extending through the sleeves 12 and 24 on which the gears 11, 14 and 23 are secured is a shaft 26 to one end of which is secured the worm 27 engaging a worm wheel 28 secured to the vertical shaft 29. The shaft 26 has splined thereto and movable longitudinally thereon a clutch member 30, located between the two miter gears 14 and 23, and arranged to be moved on said shaft 26 by means of bell crank lever 31, so that it can be engaged at will with either of the gears 14 or 23, or placed, as shown, in an intermediate non-engaging position midway between them. When the clutch is moved toward and engaged with the gear 14 the shaft 26 and worm 27 are driven directly from the gear 11 in the same direction as that gear revolves, but when said clutch is moved toward and engaged with the gear 23 the shaft 26 and worm 27 are driven in the opposite direction through the intervening miter gear 15.

Mounted on the shaft 29 are two winding drums 34 and 35 each of which is provided with a bevel gear and one of which, such as the lowermost one 35, is keyed directly to the shaft 29. The other drum with its bevel gear is loose on the shaft and between the gears of the two drums are bevel pinions 36 mounted on an arm 37 which is carried by the shaft 29. The pinions 36 may serve to keep the rotation of the two drums synchronous, yet permit rotation of one independent of the other.

Just in advance of the two winding drums 34 and 35 and in line with the rear surfaces thereof is a movable idler sheave 38 mounted on a bracket or block 39 which slides on horizontal ways 40 on the machine frame and which can be moved longitudinally by means of screw 41 and hand wheel 42. The feed and guide cable 43 passes around an idler sheave 44 on the rear inner corner of the machine frame 1 and is then carried to the lower winding drum 35, passes 1¼ times around said drum, is then carried to and around the movable idler sheave 38 and thence back to the upper winding drum 34, around which it makes one complete turn, and is then led away from the machine to one of the jacks or anchor supports to be presently described. A third idler sheave or pulley 45 is placed at the front inner corner of the machine frame.

The machine so far described is one form of a simple machine embodying the invention. In the operation of this apparatus, the machine frame is placed at one corner of the room or chamber in which the cut is to be made in the position indicated in dotted lines in Fig. 5. The anchor or jack 46 is set up between the roof and floor of the mine with its lower end just to the right of the machine frame 1 and at a distance from the wall or face 47 in which the cut is to be made substantially equal to the length of the machine frame. The rear end of the feed rope or cable 43 leading over the upper drum 34 is secured to this jack. The opposite or front end of said cable or rope is carried around the two idle sheaves 44 and 45 and thence to a second anchor, or to one of the mine posts 48, around which it is wrapped. Said cable is then drawn tight on the winding drums 34 and 35 by moving idler sheave 38 away from the winding drums 34 and 35 to the required distance, by means of the screw 41 and hand wheel 42. The motor is then started and the clutch 19 on shaft 16 is engaged with the pinion 17, thus setting the cutting mechanism in motion. The clutch 30 is next moved into engagement with the miter gear 23 and the winding drums 34 and 35 are thereby revolved in such direction that the rear end of the feed rope 43 is wound up by the upper drum 34 while the front end is correspondingly paid out by the lower winding drum 35. The machine frame 1 is thus drawn forward, causing the cutter bar element to enter the coal or other material being cut, as shown in Fig. 5.

The tendency of the moving cutters at the forward advancing end of this cutter bar is to swing said bar to the right. In previous machines it has been necessary to prevent this by the use of a "pan", tracks, guides, or similar devices. In the improved machine described such devices are unnecessary, the cutter bar being held in position during its endwise or "sumping-in" cut by the arrangement of the feed rope itself. This is due, as will be seen by an inspection of Fig. 5, to the fact that the tensions in both the front and the rear portions of the feed rope act in such direction as to tend to swing the machine to the left, or contra-clockwise, as it is pulled forward.

The moments of the forces thus exerted are exactly opposite in direction and equal in amount to the moments of the forces due to the action of the cutters on the coal and which tend to swing or rotate the machine clockwise. If it is desirable to change the direction of the endwise movement of the machine while the sumping-in cut is being made this can be readily done by altering the position of the idler sheave 38, thereby either decreasing or increasing the rate of paying out of the feed rope or cable from the lower drum 35 and correspondingly shortening or lengthing the distance between the sheave 45 and the front support 48, and correspondingly swinging the inner end of the cutter bar to the left or to the right.

After the endwise or sumping-in cut has been completed the end of the feed rope or cable which was attached to the post 48 (or jack) is disconnected therefrom and connected to a jack 49 which is set in the left hand corner of the room substantially in line with the two idler sheaves 44 and 45 on the front end of the machine frame. The machine can now be advanced across the room in the direction of the arrows in Figs. 6, 7 and 8 by simply reversing the rotation of the winding drums 34 and 35, which is done by shifting the clutch 30 out of engagement with miter gear 23 and into engagement with miter gear 14. The feed rope or cable is now paid out by the upper drum 34 and wound up by the lower drum 35, thereby pulling the machine forward along the face of the coal. The machine is maintained in parallelism to itself during such movement by the pull of the rear end of the cable which remains attached to the jack 46 and which is paid off by the upper drum at the same rate as the other end of said cable is taken up by the lower drum. In case it is desired to alter the angular position of the machine frame with reference to the face of the coal during the progress of the cross undercutting, this can readily be done by simply moving the idler sheave 38 either toward or from the winding drum 34 and 35 by means of screw 41 and hand wheel 42. If this idler sheave is moved toward said drums the relative action of the drums on the two ends of the cable, attached respectively to the jacks 46 and 49 is altered and the rear end of the machine frame swings forward to assume the position shown in Fig. 7. If, on the other hand, the idler sheave 38 is moved away from the drums 34 and 35 the reverse action occurs and the rear end of the machine swings to the right and assumes the position shown in Fig. 8. These movements of course involve a relative change in the rate of winding up the cable by one drum as compared with the rate of its unwinding by the other drum. This relative change is taken care of either by the movement of the differential driving gears 36 on their axis of mounting, or the slip of the cable on one or the other of the two winding drums.

Fig. 9 illustrates a slightly different arrangement of feed and guide mechanism, constituting another embodiment of the invention. As here shown the rope or cable is replaced by a chain 50 which is engaged by a chain driving sprocket 51 arranged in the position of the winding drum 35 on shaft 29 to be positively driven in either direction from a motor train similar to that described, but not shown. From the sprocket 51 the chain 50 is led around an idle sheave 38a which is mounted on the end of an arm or frame 53 pivoted at 54 to the machine frame. The arm 53 and sheave 38a are moved by means of a nut 55 secured to said arm 53 and which is engaged by screw 41 provided with hand wheel 42, as in the former embodiment. In this case I provide another idler sheave 56 for guiding the rear end of chain 50 to the jack 46 when the machine is making its sumping-in cut. The operation of the machine shown in Fig. 9 is the same as that shown in Figs. 1 to 8.

Instead of rotating the screw 41 by hand wheel 42 it may be actuated by power mechanism. Several arrangements for this purpose are shown. As shown in Fig. 10, a small gear or pinion 60 is secured to the gear 11. This pinion meshes with two other gears or pinions 61 and 62, and the latter meshes with a fourth pinion 63. The pinions or gears 61, 62 and 63 are all rotatably mounted on a common swinging frame or arm 64 which is pivoted on the axis of the pinion 60 so that it can be swung in either direction to engage either the pinion 61 or the pinion 63 with a gear 65 attached to the screw 41 or hand wheel 42. It will be readily seen that by this means the screw 41 can be driven in either direction by power, or by placing the swinging frame or arm 64 in an intermediate position, the screw is left free to be turned in either direction by hand.

If desired, the idler sheave 38 or 38ª can be given a gradual movement toward or away from the drums 34 and 35 (or the equivalent chain sprocket 51) as the machine advances by this positive gear connection of the screw 41 and the driving motor; or if desired said idler sheave can be given a periodic movement back and forth by periodically reversing the position of the swinging frame or arm 64.

In order to avoid the excessive strain on the cutter bar which would result from a simultaneous forward feed and contra-clockwise angling of the machine frame, from the position shown in Fig. 6 to that shown in Fig. 8, it is generally desirable to disengage the clutch 30 while the idler sheave 38 or 38ª is being moved away from the winding drums, as the angling movement in itself feeds the outer end of the cutter bar forward against the coal. To insure the disengagement of clutch 30 while the screw 41 is being rotated by power to bring the machine to the position shown in Fig. 8, any simple form of interlocking clutch mechanism may be used, such as that shown in Fig. 10. The device here shown for this purpose consists of a rod or bar 66, one end of which is pivotally attached to the swinging frame or arm 64 and the other end of which passes loosely through a lug on the clutch lever 31, and is provided with an adjustable nut or head 67. When the swinging frame or lever 64 is in the position shown in Fig. 10 with the gear 61 in engagement with the gear 65, the screw 41 is rotated in such direction as to angle the machine frame contra-clockwise, and in this position the stop 67 is so adjusted as to draw the clutch lever 31 to its neutral position and keep the clutch 30 out of engagement with the gear 14.

In the construction thus far described the angling mechanism whether hand or power driven is entirely under the control of the machine runner, and the swinging of the machine frame in either clockwise or contra-clockwise direction takes place only when the operator himself turns the screw 41 and wheel 42, or shifts the hand control lever or frame 64 so as to turn these parts by power. In Figs. 11, 12 and 13 I illustrate an automatic shift mechanism which can be applied, if desired, to the constructions shown in Figs. 1, 2, 3 and 4 for the purpose of periodically varying the movement of the parts which shift the sheaves 38 or 38ª and thereby cause the machine frame to swing or angle in a clockwise or contra-clockwise direction. The construction of this automatic shift mechanism is such that when the sheave 38 or 38ª is being moved away from the winding drums 34 and 35 (or 51) the latter are disengaged from the driving train and the bodily forward movement of the machine frame—that movement caused by the winding up of the cable 43 or chain 50—is stopped. When the sheaves 38 or 38ª are being moved in the reverse direction the driving drums are engaged with the driving train and the machine is simultaneously moved forward by the winding up of the feed cable and angled clockwise (toward the position shown in Fig. 7) by the first mentioned movement of the sheaves 38 or 38ª.

In order to secure the above results with the construction shown in Figs. 11, 12 and 13 I mount the worm wheel 28ª loosely on the shaft 29ª. The latter is keyed, as in the previously described construction, to the lower winding drum 35, and is provided just above the hub of the upper winding drum with a conical boss or head 70 which is also keyed to the said shaft. The lower side of the worm wheel 28ª is provided with a conical recess which fits the conical boss 70, and the hub of said worm wheel extends upwardly through the bearing 71 at the upper end of the shaft 29ª. Secured to the upper end of the worm wheel boss or hub is a cam plate 72 (Fig. 13), the edge of which engages with a cam roller 73 mounted on one arm of a bell crank lever 74. The other arm of said lever 74 is forked to pivotally engage a collar 75 which moves vertically on an extension of the winding drum shaft 29ª. The collar 75 engages with a ring 76 having two diametrically opposite pivot bosses to which are attached the inner ends of links 77, 77, the outer ends of which are pivotally secured to the clutch arms 78. These clutch arms are pivoted on a head 79 which is adjustably secured (as by threading) to the shaft 29ª and are provided with eccentric clutch engaging surfaces which bear upon the upper face of the cam plate 72. The bell crank lever 74 is pivotally mounted at its vertex on a suitable support 80 which may be cast as a part of the cap plate which carries the bearing 71. The support 80 is recessed to receive a spring 81 bearing against the vertical arm of the lever 74 and serves to keep the cam roller 73 in engagement with the edge of the cam plate 72. A bolt 82 is passed through the arm of the lever 74 and the support 80 and is provided with an adjustable head 83. The arm 74 is keyed or otherwise secured to a shaft 84 which is carried across the frame of the machine parallel with the shaft 26, and which terminates just beyond the gear 11 in a downwardly extending arm 85. The arm 85 carries near its outer end an adjustable pin 86 which enters a slot in the swinging frame or arm 64$^a$ which is pivoted on the shaft 26 and carries the spur gears 61$^a$, 62$^a$ and 63$^a$. The gear 61$^a$ is in engagement with the gear 60$^a$ which is secured to the outer face of the gear 11, and the gears 62$^a$ and 63$^a$ are in engagement with a smaller gear 60$^b$ which is secured to the gear 60$^a$.

The operation of this automatic shift mechanism is as follows: When the parts are in the position shown in Figs. 12 and 13 the worm wheel 28$^a$ is clutched to the conical head 70 of the shaft 29$^a$ by the clamping engagement of the eccentric heads of the lever 79 and the cam plate 72. In this position of parts the vertical arm of the bell crank lever 74 and the arm 85 (which moves therewith) is moved to its extreme right hand position as viewed in Fig. 12 (or to its extreme left hand position as viewed from the opposite direction in Fig. 13) and the swing frame 64$^a$ is consequently in such position that the gear 63$^a$ is in engagement with the gear 65. The screw 41 is at this time driven in such direction by the gears 60$^b$, 62$^a$, 63$^a$ and 65 that the sheave 38 (or 38$^a$ as the case may be) is moved toward the winding drums of the machine, thus allowing the frame to swing clockwise (toward the position shown in Fig. 7) as it is advanced by the winding up of the feed cable or chain on the drums, which are being turned in the direction to advance the machine. The edge of the cam plate 72 is so shaped that at the required periodic intervals (which may correspond to any desired part of a complete revolution of the worm wheel 28$^a$ and cam plate 72) the cam roller 73 may be moved to the left by the pressure of the spring 81 a sufficient distance to unclamp the worm wheel 28$^a$ from the conical head 70 of the shaft 29$^a$, thus arresting the winding movement and stop the bodily forward movement of the machine. This movement of the cam roller and the lever 74 effects the corresponding angular movement of the arm 85 which withdraws the gear 63$^a$ from engagement with the gear 65 and brings the gear 61$^a$ into engagement therewith. This causes the screw 41 to be revolved in such direction as to now move the sheave 38 (or 38$^a$) away from the winding drums and thereby swing the machine frame in contra-clockwise direction or toward the position shown in Fig. 8. By making the gear 60$^a$ which drives the gear 61$^a$ of considerably larger size than the gear 60$^b$ which drives the gears 62$^a$ and 63$^a$, I can swing the machine frame much more rapidly in this contra-clockwise direction than in the clockwise direction. As already explained the swing of the machine in the contra-clockwise direction itself feeds the front end of the cutter bar into the coal without any bodily forward movement of the machine. Hence by suitably varying the relative size of the gears 60$^a$ and 60$^b$ and properly proportioning the movement of the take-up sheave 38 (or 38$^a$) and the movement of the winding drums, I can very nearly equalize the cutting action at different parts of the complete cycle of movements; that is to say I can make the cutting action which is obtained when the machine is simultaneously being moved bodily forward (by the winding up of the feed cable on the drums 34 and 35) and being swung clockwise (by the movement of the take-up sheave 38 toward said winding drums) substantially the same as is obtained when the winding drums are stopped (by their disengagement from the driving worm wheel) and the machine is being swung contra-clockwise by the movement of the sheave 38, or 38$^a$, away from said winding drums.

The relation between the angular swinging movements of the machine and its bodily advance along the coal face (by the action of the winding drums) may be varied by varying the angular intervals between the different raised and depressed sections of the cam 72. The cam may be provided with as many elevated and depressed sections as are necessary to produce the required periodicity of angular movements. If the cam has only two sections there will of course be only one complete swing from the extreme left hand position to the extreme right hand position in one complete revolution of the worm wheel 28$^a$ and attached cam 72. If the cam is provided with two elevated sections and two depressed sections there will be two complete cycles of angular movements for each revolution of the driving worm. In general the relative arcs of engagement of the elevated and depressed portions of the cam with the cam roller 73 are made inversely proportional to the ratios between the gears 60$^b$ and 60$^a$, in order that the angular swing of the machine in a contra-clockwise direction may be substantially equal to that of its reverse swing in a clockwise direction.

The mechanism illustrated in Figs. 11 and 12 can, if desired, be readily made non-automatic and controlled at will by the machine runner. To do this it is only necessary to screw up the nut 83 until the shift lever 74 is held permanently in the position illustrated in Fig. 11, and release the rod 84 from the swinging frame 64ª. To readily effect such release the arm 85 may be engaged with the rod 84 by a sliding dog clutch 88 (Fig. 15) or in any other suitable manner. After the rod 84 has been thus released from the swinging frame or arm 64ª, the latter may be moved by hand to engage either the gear 63ª or the gear 61ª with the gear 65 and thereby move the screw 41 and the sheave 38 in either direction as required to angle the machine clockwise or contra-clockwise. In order to hold the swinging frame 64ª in any desired position it may be provided with a segmental slot 90 through which the end of the rod 84 passes. A nut (or hand wheel) 91 on the end of this rod serves to clamp the frame or arm 64ª in any desired position.

In order to automatically stop the bodily forward movement of the machine when the gear 61ª is engaged with the gear 65 (the machine is thereby being angled contra-clockwise) a connecting bar 66 such as is used in construction shown in Fig. 10 may be coupled to the end of the frame or arm 64ª and adjusted in such manner as to disengage the main clutch 30 from the gear 14 when the frame 64ª is moved to the right hand position.

In Figs. 17 and 18 I illustrate another form of automatic shift mechanism which may be attached to the apparatus shown in Figs. 1, 2, 3 and 4, or that shown in Fig. 9. In this form of automatic shift mechanism I provide an auxiliary worm wheel 92 which is mounted on a stud in an eccentric bearing 93 in such manner that it can be engaged or disengaged at will with the main driving worm 27. Secured to this auxiliary worm wheel 92 is a cam 94 which moves with the worm wheel, and as it revolves imparts motion to a cam roller 95 mounted on a lever 96. The lower end of this lever is forked to engage a collar on the end of a rod 97 which slides freely in the shaft 26, said shaft being in this case made hollow to receive said rod. The left hand end of the rod 97 is engaged by means of spline pins 98 with a collar 99, on which is rotatably mounted a gear 100 which engages directly with the gear 65 (see Fig. 18). The inner end of the hub of gear 100 is provided with clutch dogs 101 which, when the gear is in the position shown in Fig. 17, engage with corresponding dogs on the hub of the main driving gear 11. Mounted at the outer end of the shaft 26, so as to revolve freely thereon, is a chain sprocket wheel 102 which is geared directly by means of a chain 103 to the chain wheel 104 secured either to the face of the gear 65 or to the screw 41. The inner face of the sprocket wheel 102 is provided with clutch dogs 105 which are adapted to engage corresponding dogs 106 on the outer end of the sliding collar 99. Near the middle of the rod 97 is a key way 107 into which projects one of the spline pins 108 which secures the clutch collar 30 to the shaft 26, and this key way is so positioned that when the gear 100 is engaged with the main gear 11 the clutch 30 is disengaged from the miter gear 14. The cam roller 95 is held against the cam 94 by means of a spring 109. When the cam 94 revolves to such point as to bring its depressed portion opposite the roller 95, the lever 96 is moved by the spring 109 so as to throw the rod 97 to the left, thereby disengaging the gear 100 from the gear 11 and engaging the collar 99 (which revolves with the shaft 26) with the sprocket wheel 102. The movement of this rod 97 to the left allows the clutch collar 30 to be once more engaged with the gear 14, this engagement being effected by moving the lever 31 by hand or by suitable means.

The operation of this clutch mechanism is similar in character to that illustrated in Figs. 12 and 13, except that the action of the elevated and depressed portions of the shift cam is reversed. When the high portions of this cam are engaged with the cam roller 95 the gear 100 is in engagement with the main gear 11 and drives the gear 65 in such direction as to move the sheave block 38 (or 38ª) away from the main driving drum and thus angle the machine contra-clockwise or toward the position shown in Fig. 8. In order to secure this result it is of course necessary that the pitch of the screw 41 should be reverse of that which it has in construction of Figs. 1, 2, 3, 4, 9 and 10, since the idle gear 61 (61ª) is in this case omitted and the direction of rotation of the gear 65 is the reverse from that which it has in the previously described constructions. At the time when this movement of the machine frame in the contra-clockwise direction is taking place the main clutch 30 is disengaged from the miter gear 14 thus stopping the movement of the main winding drums and arresting the bodily forward movement of the machine frame. When the cam 94 revolves to such a position that one of its depressed portions comes opposite the cam roller 95 the shift lever 96 is moved by the spring 109 to such position that the collar 99 is engaged with the sprocket wheel 105, and the screw 41 is then revolved in the opposite direction by the chain connection 103, thus moving the sheave block 38 (or 38ª) toward the winding drums and causing the machine frame to angle in a clockwise direction, or toward the position shown in Fig. 7. As already explained, the movement of the shaft 97 and collar 99 into engagement with the sprocket wheel 102 releases the main clutch collar 30 and allows it to again engage with the miter gear 14 thus starting the winding drums and causing the main frame to be again drawn forward by the winding in of the feed cable or chain 43 or 50. As in the previous construction the arcs of engagement of the elevated and depressed portions of the shift cam 92 are made inversely proportional to the speed with which the screw 41 is turned; and the driving ratio between the gears 100 and 65 is made much larger than the driving ratio between the chain sprockets 102 and 104. In this way I obtain a substantially equal angular swinging movement of the machine frame in both directions; and I can also obtain, by properly proportioning the parts, substantial equality of cutting action at all times, the increased speed of angular swing in contra-clockwise direction while the machine is standing still balancing the decreased speed of angular swing while the machine is simultaneously moving in a clockwise direction and advancing along the coal face. By varying the size of the auxiliary worm wheel 92, and by varying the number of elevated and depressed portions on the shift cam 94 I can secure any desired relation between the advancing movement of the machine frame and the swinging movement thereof to the right and to the left.

If it is desired to control the swinging movements by hand this can be readily done by throwing the auxiliary worm wheel 92 out of engagement with the driving worm 29 by means of the eccentric 93 and operating the lever 96 by hand. In this case it is desirable to provide a spring catch 110 which will hold the lever 96 in either of its extreme positions, or hold it in an intermediate position in which both the gear 100 and the sprocket wheel 102 are disengaged from their driving parts and the screw 41 can then be turned by hand if desired in either direction to bring the machine frame to any required position.

After the cross undercut has been completed the machine can be drawn back to the side of the room from which it was started by simply reversing the direction of the movement of the feed mechanism, or by disconnecting the forward end of the cable or chain from the jack 49, reversing its position around idler sheave 44, as shown in dotted lines in Fig. 1, and then continuing the motion of the drums in the same direction as before. In such cases the slack of the cable leaving the unwinding drum must be taken up by hand or in some other convenient manner.

The advantages of my invention will be readily apprehended by those skilled in the art. No guides or tracks are necessary to direct the course of the machine in making either the preliminary sumping-in cut or the cross undercut. Only one setting of the cable or chain jacks is necessary for both cuts and no readjustment of the chain or cable lengths is necessary in changing from the sumping-in to the cross undercut. The angular position of the machine with reference to the coal face may be readily changed and controlled during either cut by the operator at the machine, who does this without leaving his position by merely operating the screw 41 by hand or by power. The machine may also, if desired, be given a periodic swinging or oscillatory angling movement during the cut, by a periodic reversal of the movement of the sheave 38 (or corresponding chain wheel 38ᵃ) through the use of the direct and reversing train of gearing connecting the screw 41 with the motor train. With an automatic shift mechanism such as illustrated in Figs. 12 and 13, and 17 and 18, this periodic swinging movement may be made purely automatic and the machine frame alternately advanced while swinging clockwise, and held stationary while swinging contra-clockwise, the two movements being so controlled by the operation of the machine itself as to substantially equalize the cutting action at all times. This advancement of the machine with an alternate swinging movement to the right and left, clockwise and contra-clockwise, instead of parallel to itself, presents certain advantages in increasing the speed of cutting and reducing the duty on the cutting bits and enables the machine to more readily cut around and remove hard nodules and sulfur balls, etc., which are frequently encountered in certain kinds of coal. The method of cutting by an oscillatory swinging advance of the machine frame and cutter bar I term the "zig zag" method of cross undercutting and is more fully described and claimed in a companion application Serial No. 690,486, filed April 13, 1912.

Finally, it may be noted that the feed and guide mechanism as a whole and in all of its parts is very simple and strong in construction and easily repaired in case of injury or breakage.

It will be further apparent to those skilled in the art that various mechanical changes may be made in the designed construction and arrangement of the various parts of the machine without departing from the invention disclosed herein.

Thus, instead of using one continuous length of rope or chain, two lengths may be used if desired (Fig. 17); one length 43ᵃ having one end permanently secured to one winding drum 35ᵃ, and the other part 44ᵇ having one secured permanently to the other winding drum 34ᵃ. In this case both drums are positively driven in the same direction and at the same speed. The free end of the rope or chain 43ᵃ which is wound in one direction on drum 35ᵃ is led around the idler sheave 45 and is attached to the support 48 or the jack 49, as before; while the free end of the rope or chain 44$^b$ which is wound in the opposite direction on the other drum 34$^a$, is led around the idle sheave 38 (or 38$^a$) and thence back to jack 46; the idle sheave 56 being in this case always provided to guide the cable or chain in the proper direction while the sumping-in cut is being made. Both of the winding drums in this case are wide enough to take up the entire run of the cable or chain.

It is further obvious that in case this double cable or chain is used the winding drums 34$^a$ and 35$^a$ may be driven positively in opposite directions by clamping the arm carrying the bevel pinions 36 to the frame of the machine, or, more simply, in the same direction by clamping both to the shaft 29, or by securing them to a horizontal shaft 29$^b$, as in Fig. 17. In the latter case it is only necessary to lead the rear cable 43$^a$ to the idle sheave 38 (or 38$^a$) from the inner side of the drum 35$^a$ instead of from the other side. Moving the take-up sheave 38 by the screw 41 causes the machine to angle in the same direction as before.

It is further obvious that instead of feeding the machine during the sumping-in cut by attaching the rear end of the cable or chain to the jack 46, this cut may be made by attaching the front end of the cable or chain to jack 46 and leading the rear end away toward the idler sheave 38 (or drum 34) to the mine support 48. In such cases the preliminary end cut is made by driving the feed drum or sprocket in the same direction in which it moves during the cross and side undercutting. But this mode of feeding the machine during the sumping-in cut is less advantageous than the one first described because it requires, first, the disconnection of both ends of the cable or chain from their fixed supports after the sumping-in cut is completed; second, the pulling back of the chain or cable to the position of Figs. 5 and 6; and, third, the reconnection of both ends of the cable or chain, as shown in Fig. 6, before the cross or side undercut can be begun.

In the foregoing description of construction and of operation I have shown and described only left hand types of machines i. e., machines which are designed to cut from the right hand side of the room toward the left hand side. My improvements are of course equally applicable to right hand types of machines and the changes necessary to adapt said improvements to such machines will be readily understood by any skilled mechanic without further description. In the latter type of machines the angling movements which I have described as clockwise and contra-clockwise would be reversely designated if the movement of the machine is in all cases viewed from above. Therefore it is to be understood that in speaking generally of a clockwise angling I mean to designate an angular movement of such character as will cause the outer end of the cutter bar to move slower than the machine frame, while by a contra-clockwise angling I mean to designate such an angling movement as will cause the outer end of the cutter bar to move faster than the machine frame.

What I claim is:

1. Feed guide mechanism for mining machines comprising in combination, a flexible guiding element having its free ends adapted for attachment to fixed points of support in the mine at the front and rear of the machine and engaging the machine respectively at the cutter end and at the opposite or outer end, a guiding element driving mechanism on the machine, a movable take-up around which the flexible element passes, interposed between the driving mechanism and one of said fixed points of support, whereby the angular position of the machine frame may be varied by movement of said movable take-up, and connections from the driving mechanism arranged to actuate said take-up in either direction.

2. Feed guide mechanism for mining machines comprising in combination, a flexible guiding element having its free ends adapted for attachment to fixed points of support in the mine at the front and rear of the machine and engaging the machine respectively at the cutter end and at the opposite or outer end, guiding element driving mechanism on the machine, a movable take-up around which the flexible element passes, interposed between the driving mechanism and one of said fixed points of support, whereby the angular position of the machine frame may be varied by the movement of said movable take-up, and mechanism for periodically moving said take-up in opposite directions and for simultaneously stopping the driving mechanism when angling the machine so that the cutter advances more rapidly than the machine frame.

3. Feed guide mechanism for mining machines comprising in combination, a flexible guiding element having its free ends adapted for attachment to fixed points of support in the mine at the front and rear of the machine and engaging the machine respectively at the cutter end and at the opposite or outer end, guiding element driving mechanism on the machine, a movable take-up around which the flexible element passes, interposed between the driving mechanism and one of said fixed points of support, whereby the angular position of the machine frame may be varied by the movement of said movable take-up, and driving mechanism for moving said take-up, including shifting means for reversing the movement of said take-up.

4. Feed guide mechanism for mining machines comprising in combination, a flexible guiding element having its free ends adapted for attachment to fixed points of support in the mine at the front and rear of the machine and engaging the machine respectively at the cutter end and at the opposite or outer end, a guiding element driving mechanism on the machine, a movable take-up around which the flexible element passes, interposed between the driving mechanism and one of said fixed points of support, whereby the angular position of the machine frame may be varied by the movement of said movable take-up, mechanism for moving said take-up, including a shifting element arranged to produce actuation of the take-up in opposite directions, and a clutch arranged to disengage the chain or cable driving mechanism when said shifting element is in one active position.

5. Feed guide mechanism for mining machines comprising in combination, a flexible guiding element having its free ends adapted for attachment to fixed points of support in the mine at the front and rear of the machine and engaging the machine respectively at the cutter end and at the opposite or outer end, guiding element driving mechanism on the machine, a movable take-up around which the flexible element passes, interposed between the driving mechanism and one of said fixed points of support, whereby the angular position of the machine frame may be varied by the movement of said movable take-up, mechanism for moving said take-up, including a shifting element arranged to produce actuation of the take-up in opposite directions, a clutch arranged to disengage the driving mechanism when said shifting element is in one active position, and a cam arranged to actuate said shifting element.

In testimony whereof I have hereunto set my hand.

FRANK L. O. WADSWORTH.

Witnesses:
F. W. WINTER,
MARY E. CAHOON.